(12) United States Patent
Chowdhury et al.

(10) Patent No.: US 10,717,038 B2
(45) Date of Patent: Jul. 21, 2020

(54) ABSORBING SOLUTION FOR SEPARATING AND CAPTURING CARBON DIOXIDE, AND METHOD FOR SEPARATING AND CAPTURING CARBON DIOXIDE IN WHICH SAME IS USED

(71) Applicants: RESEARCH INSTITUTE OF INNOVATIVE TECHNOLOGY FOR THE EARTH, Kyoto (JP); NIPPON STEEL & SUMITOMO METAL CORPORATION, Tokyo (JP)

(72) Inventors: Firoz Alam Chowdhury, Kyoto (JP); Tsuguhiro Kato, Kyoto (JP); Yoichi Matsuzaki, Tokyo (JP); Masami Onoda, Tokyo (JP)

(73) Assignees: RESEARCH INSTITUTE OF INNOVATIVE TECHNOLOGY FOR THE EARTH, Kyoto (JP); NIPPON STEEL CORPORATION, Tokyo (JP)

(*) Notice: Subject to any disclaimer, the term of this patent is extended or adjusted under 35 U.S.C. 154(b) by 145 days.

(21) Appl. No.: 15/560,354

(22) PCT Filed: Mar. 18, 2016

(86) PCT No.: PCT/JP2016/058715
§ 371 (c)(1),
(2) Date: Sep. 21, 2017

(87) PCT Pub. No.: WO2016/152782
PCT Pub. Date: Sep. 29, 2016

(65) Prior Publication Data
US 2018/0078893 A1    Mar. 22, 2018

(30) Foreign Application Priority Data
Mar. 26, 2015   (JP) ................... 2015-064402

(51) Int. Cl.
*B01D 53/14* (2006.01)
*C01B 32/50* (2017.01)
*B01D 53/78* (2006.01)
*B01D 53/62* (2006.01)

(52) U.S. Cl.
CPC ......... *B01D 53/1493* (2013.01); *B01D 53/14* (2013.01); *B01D 53/1418* (2013.01); *B01D 53/1425* (2013.01); *B01D 53/1475* (2013.01); *B01D 53/62* (2013.01); *B01D 53/78* (2013.01); *C01B 32/50* (2017.08); *B01D 2252/103* (2013.01); *B01D 2252/2026* (2013.01); *B01D 2252/2028* (2013.01); *B01D 2252/20484* (2013.01); *B01D 2252/504* (2013.01); *B01D 2257/504* (2013.01); *B01D 2258/025* (2013.01); *B01D 2258/0233* (2013.01); *B01D 2258/0283* (2013.01); *C01B 2210/0025* (2013.01); *Y02C 10/04* (2013.01); *Y02C 10/06* (2013.01); *Y02P 20/129* (2015.11)

(58) Field of Classification Search
CPC ............ B01D 53/1475; B01D 53/1493; B01D 53/1425; B01D 2252/2026; B01D 2252/204; B01D 2252/20478; B01D 2252/20484
USPC ..................................... 95/236, 230
See application file for complete search history.

(56) References Cited

U.S. PATENT DOCUMENTS

| | | | |
|---|---|---|---|
| 6,036,931 A * | 3/2000 | Yoshida ............. | B01D 53/1475 423/228 |
| 6,265,365 B1 | 7/2001 | Herget et al. | |
| 2005/0169825 A1 | 8/2005 | Cadours et al. | |
| 2007/0148069 A1* | 6/2007 | Chakravarti ....... | B01D 53/1475 423/220 |
| 2009/0199709 A1 | 8/2009 | Rojey et al. | |
| 2010/0126348 A1 | 5/2010 | Shimizu et al. | |
| 2011/0081287 A1 | 4/2011 | Bouillon et al. | |
| 2011/0214566 A1* | 9/2011 | Lee .................... | B01D 53/1475 95/173 |
| 2014/0127119 A1* | 5/2014 | Fujimoto ........... | B01D 53/1425 423/437.1 |
| 2015/0044114 A1 | 2/2015 | Murai et al. | |

FOREIGN PATENT DOCUMENTS

| | | |
|---|---|---|
| CN | 104338413 A | 2/2015 |
| CN | 104411806 A | 3/2015 |

(Continued)

OTHER PUBLICATIONS

International Search Report dated Jun. 21, 2016 from International Application No. PCT/JP2016/058715, 4 pages, including English translation.

(Continued)

*Primary Examiner* — Thuan D Dang
(74) *Attorney, Agent, or Firm* — MH2 Technology Law Group, LLP

(57) ABSTRACT

Disclosed is an absorbing liquid for separating and capturing carbon dioxide from a carbon dioxide-containing gas, the absorbing liquid containing: at least one alkanolamine represented by formula (1)

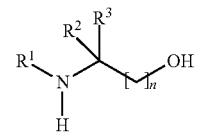

wherein $R^1$ represents hydrogen or $C_{1-4}$ alkyl, $R^2$ and $R^3$ are identical or different and each represent hydrogen or $C_{1-3}$ alkyl, $R^1$, $R^2$, and $R^3$ are not all hydrogen, and n is 1 or 2; a low-molecular-weight diol compound and/or glycerin; and water.

4 Claims, No Drawings

(56) References Cited

FOREIGN PATENT DOCUMENTS

| | | |
|---|---|---|
| GB | 1596753 A | 8/1981 |
| JP | 2871334 B2 | 11/1993 |
| JP | H5-301023 A | 11/1993 |
| JP | 2005-230808 A | 9/2005 |
| JP | 2009-521313 A | 6/2009 |
| JP | 2009-529420 A | 8/2009 |
| JP | 5452222 B2 | 8/2010 |
| JP | 2010-207809 A | 9/2010 |
| JP | 2012-236165 A | 12/2012 |
| WO | 2012/034921 A1 | 3/2012 |
| WO | 2012/093853 A2 | 7/2012 |
| WO | 2014/004019 A1 | 1/2014 |

OTHER PUBLICATIONS

Extended European Search Report dated Nov. 9, 2018 from European Application No. 16768685.6, 9 pages.

Zheng et al., "CO2 Solubility in a Mixture Absorption System of 2-Amino-2-methyl-1-propanol with Ethylene Glycol", Industrial & Engineering Chemistry Research, Aug. 13, 2013, vol. 52, No. 34, pp. 12247-12252.

Chinese Office Action dated Nov. 25, 2019 for Chinese Patent Application No. 201680018432.2, 18 pages with English translation.

\* cited by examiner

ABSORBING SOLUTION FOR SEPARATING AND CAPTURING CARBON DIOXIDE, AND METHOD FOR SEPARATING AND CAPTURING CARBON DIOXIDE IN WHICH SAME IS USED

CROSS-REFERENCE TO RELATED APPLICATIONS

This application is a U.S. National Stage application of PCT/JP2016/058715 filed 18 Mar. 2016, which claims priority to Japanese Application No. 2015-064402 filed 26 Mar. 2015, the entire disclosures of which are hereby incorporated by reference in their entireties.

TECHNICAL FIELD

The present invention relates to absorbing liquids for separating and capturing carbon dioxide from a carbon dioxide-containing gas, and methods for separating and capturing carbon dioxide from a carbon dioxide-containing gas using the absorbing liquids.

BACKGROUND ART

Recent years have seen climate changes and natural disasters likely due to global warming significantly affecting agricultural production, dwelling environments, and energy consumption. Global warming is believed to be caused by increased greenhouse gases in the atmosphere accompanying the expansion of human activities, such as carbon dioxide, methane, nitrous oxide, and chlorofluorocarbons. Among these greenhouse gases, carbon dioxide in the atmosphere is considered to be the primary cause, and taking measures to reduce emissions of carbon dioxide into the atmosphere is a worldwide agenda.

The sources of carbon dioxide include thermal power plants using fuels such as coal, heavy oil, and natural gas, ironworks blast furnaces for reducing iron oxide with coke, ironworks converters for burning carbon contained in pig iron to manufacture steel, factory boilers, and cement plant kilns, as well as transport equipment including automobiles, marine vessels, and aircraft using fuels such as gasoline, heavy oil, and light oil. Except for transport equipment, the sources above are stationary facilities where it is thus easy to take measures to reduce emissions of carbon dioxide into the atmosphere.

Several methods for separating and capturing carbon dioxide from gases emitted from the sources listed above are known.

For example, a method for absorbing carbon dioxide by bringing a carbon dioxide-containing gas into contact with an aqueous solution of an alkanolamine in an absorption tower is known.

Examples of known alkanolamines include monoethanolamine, diethanolamine, triethanolamine, methyl diethanolamine, diisopropanolamine, and diglycolamine, and of these, monoethanolamine is widely used.

The use of aqueous solutions of these alkanolamines as an absorbing liquid for carbon dioxide, however, requires the use of expensive corrosion-resistant steel or requires lowering the concentration of the amine in the absorbing liquids because primary amines such as monoethanolamine severely corrode materials of equipment. The absorbed carbon dioxide is typically desorbed and regenerated by heating the absorbing liquid to about 120° C. in a regeneration tower, but this method ends up consuming a large amount of energy in capturing carbon dioxide per unit weight because the use of the alkanolamines is unsatisfactory in terms of the amount of absorbed carbon dioxide in the absorption tower and the amount of desorbed carbon dioxide in the regeneration tower.

In an age in which reducing $CO_2$ emissions and saving energy and natural resources are being sought, large energy consumption in separating and capturing carbon dioxide has been a major constraint on practical use of the technology, and techniques for separating and capturing carbon dioxide with less energy need to be developed.

As an example of prior art techniques for separating and capturing carbon dioxide using less energy, PTL 1, for example, discloses a method for removing carbon dioxide from a combustion exhaust gas by bringing an aqueous solution of a specific hindered amine into contact with a combustion exhaust gas at atmospheric pressure. The Examples of PTL 1 disclose N-methylaminoethanol and N-ethylaminoethanol as hindered amines, and also other amines, such as 2-isopropylaminoethanol, which is not used in the Examples though.

PTL 2 discloses an absorbing liquid that contains a mixture of multiple alkanolamines and that achieves the highest performance taking advantage of the characteristics of each amine, and a method for absorbing carbon dioxide.

These absorbing liquids disclosed in PTL 1 and 2, however, cannot sufficiently reduce the energy required for separating and capturing carbon dioxide. In PTL 3, studies were conducted on the use of a non-aqueous organic compound such as an alcohol instead of an aqueous liquid, which uses water with a large specific heat capacity, as a solvent. Because the use of an alcohol, for example, instead of water lowers the specific heat, and carbon dioxide is once converted to unstable alkyl carbonate in the steps of separating and capturing carbon dioxide, the use of an alcohol is expected to improve low-temperature desorption. Nonetheless, an absorbing liquid of such a composition exhibits extremely low $CO_2$ absorption efficiency and requires absorption of carbon dioxide to be performed at low temperatures in the range of 20° C. to 25° C., meaning that extra energy for cooling in absorption is necessary.

PTL 4 and 5 propose an absorbing liquid of a two-phase separation system. After having absorbed an acidic compound such as carbon dioxide, the absorbing liquid separates into a phase rich in the acidic compound and a phase poor in the acidic compound. From these phases, the phase rich in the acidic compound is separated with, for example, a decantation equipment, and only from the phase rich in the acidic compound, the acidic compound is desorbed in an effort to reduce the amount of the absorbing liquid to be heated and energy required in desorption. However, a significant amount of the acidic compound also remains in the phase poor in the acidic compound, and the capture efficiency is in fact unsatisfactory.

CITATION LIST

Patent Literature

PTL 1: U.S. Pat. No. 2,871,334
PTL 2: U.S. Pat. No. 5,452,222
PTL 3: JP2012-236165A
PTL 4: JP2009-529420A
PTL 5: JP2010-207809A

SUMMARY OF INVENTION

Technical Problem

An object of the present invention is to provide absorbing liquids and methods for separating and capturing carbon dioxide highly efficiently at lower energy costs.

Solution to Problem

The present inventors conducted extensive research to achieve the object, and found that an absorbing liquid comprising at least one specific alkanolamine, a low-molecular-weight diol compound and/or glycerin, and water can improve the desorption rate and regeneration efficiency of carbon dioxide at low temperatures, thereby efficiently separating and capturing carbon dioxide from a carbon dioxide-containing gas. The inventors conducted further research based on these findings, and completed the present invention.

Specifically, the present invention provides the following absorbing liquids for separating and capturing carbon dioxide, and methods for separating and capturing carbon dioxide.

Item 1.

An absorbing liquid for separating and capturing carbon dioxide from a carbon dioxide-containing gas, the liquid comprising:
at least one alkanolamine represented by formula (1)

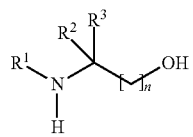

wherein $R^1$ represents hydrogen or $C_{1-4}$ alkyl, $R^2$ and $R^3$ are identical or different and each represent hydrogen or $C_{1-3}$ alkyl, $R^1$, $R^2$, and $R^3$ are not all hydrogen, and n is 1 or 2;
a low-molecular-weight diol compound and/or glycerin; and
water.

Item 2.

The absorbing liquid according to Item 1, wherein $R^1$ represents hydrogen, methyl, ethyl, n-propyl, isopropyl, or n-butyl, $R^2$ and $R^3$ are identical or different and each represent hydrogen or methyl, and n is 1 or 2.

Item 3.

The absorbing liquid according to Item 1 or 2, wherein the alkanolamine represented by formula (1) is an amine mixture of
(I) an alkanolamine wherein $R^1$ represents methyl, ethyl, n-propyl, isopropyl, or n-butyl, $R^2$ and $R^3$ each represent hydrogen, and n is 1 or 2, and
(II) an alkanolamine wherein $R^1$ represents hydrogen, $R^2$ and $R^3$ each represent methyl, and n is 1.

Item 4.

The absorbing liquid according to Item 3, wherein the alkanolamine represented by formula (1) is an amine mixture of N-isopropylaminoethanol and 2-amino-2-methyl-1-propanol.

Item 5.

The absorbing liquid according to any one of Items 1 to 4, wherein the low-molecular-weight diol compound and/or glycerin has a concentration of 5 to 30 wt %.

Item 6.

The absorbing liquid according to any one of Items 1 to 4, wherein the low-molecular-weight diol compound and/or glycerin is ethylene glycol and has a concentration of 5 to 20 wt %.

Item 7.

A method for separating and capturing carbon dioxide from a carbon dioxide-containing gas, the method comprising the following steps A and B:
step A of bringing the absorbing liquid according to any one of Items 1 to 6 into contact with a carbon dioxide-containing gas to obtain the absorbing liquid that has absorbed carbon dioxide from the carbon dioxide-containing gas; and
step B of heating the absorbing liquid that has absorbed carbon dioxide obtained in step A to desorb and regenerate carbon dioxide from the absorbing liquid and capturing the desorbed carbon dioxide.

Item 8.

The method according to Item 7, wherein the absorbing liquid that has absorbed carbon dioxide is heated at a temperature of 80 to 95° C. in step B to desorb carbon dioxide.

Advantageous Effects of Invention

The present invention enables absorbing liquids formed of aqueous liquids of the same amine composition to desorb carbon dioxide at lower temperatures. The present invention can also capture carbon dioxide with lower energy consumption. This reduces the energy required for separating and capturing carbon dioxide, and captures carbon dioxide efficiently with low energy consumption. Because of its significantly improved performance in desorbing carbon dioxide at low temperatures, the invention enables the use of "low-grade waste heat," which is normally discarded, and can substantially reduce energy required for separating and capturing carbon dioxide.

DESCRIPTION OF EMBODIMENTS

The following describes the present invention in detail.
Absorbing Solution for Separating and Capturing Carbon Dioxide The absorbing liquid of the present invention comprises:
at least one alkanolamine represented by formula (1)

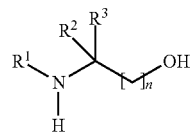

wherein $R^1$ represents hydrogen or $C_{1-4}$ alkyl, $R^2$ and $R^3$ are identical or different and each represent hydrogen or $C_{1-3}$ alkyl, $R^1$, $R^2$, and $R^3$ are not all hydrogen, and n is 1 or 2;
a low-molecular-weight diol compound and/or glycerin; and
water.

$R^1$ in formula (1) may be any of hydrogen or $C_{1-4}$ linear or branched alkyl, and may specifically be hydrogen, methyl, ethyl, n-propyl, isopropyl, n-butyl, or the like. Of these, hydrogen, ethyl, n-propyl, isopropyl, and n-butyl are preferable, with isopropyl being more preferable.

In formula (1), n is 1 or 2, and more preferably 1.

In formula (1), $R^2$ and $R^3$ may be any of hydrogen or $C_{1-3}$ linear or branched alkyl, and may specifically be hydrogen, methyl, ethyl, n-propyl, or isopropyl. Of these, hydrogen and methyl are preferable.

Specific alkanolamines represented by formula (1) include N-ethylaminoethanol, N-n-propylaminoethanol, N-isopropylaminoethanol, N-n-butylaminoethanol, 2-amino-1-propanol, N-isobutylaminoethanol, 2-amino-2-methyl-1-propanol, 3-ethylamino-1-propanol, 3-n-propylamino-1-propanol, 3-isopropylamino-1-propanol, 3-n-butylamino-1-propanol, and 3-isobutylamino-1-propanol. These can also be used on an industrial scale.

The absorbing liquid of the present invention comprises at least one alkanolamine represented by formula (1) or an amine mixture containing two or more alkanolamines represented by formula (1).

Examples of amine mixtures include amine mixtures of (I) an alkanolamine wherein $R^1$ represents methyl, ethyl, n-propyl, isopropyl, or n-butyl, $R^2$ and $R^3$ each represent hydrogen, and n is 1 or 2, and (II) an alkanolamine wherein $R^1$ represents hydrogen, $R^2$ and $R^3$ each represent methyl, and n is 1. Of these, an amine mixture of N-isopropylaminoethanol and 2-amino-2-methyl-1-propanol is preferable.

The following describes the total amount of alkanolamine(s) in the absorbing liquid of the present invention.

Typically, as the concentration of the amine component increases, the absorption amount, absorption rate, desorption amount, and desorption rate of carbon dioxide per unit volume of the liquid increase, and from the standpoint of energy consumption, plant equipment size, and efficiency, a higher concentration of the amine component is preferable. However, a weight concentration of the amine component exceeding 70% is likely to cause problems such as decreases in the absorption amount of carbon dioxide, decreases in the degree of mixedness of the amine component, and increases in viscosity, perhaps due to decreased surfactant action of water.

In the absorbing liquid of the present invention as well, the total amount of alkanolamine(s) is preferably 60 wt % or less, given the problems such as decreases in the degree of mixedness of the amine component and increases in viscosity. From the standpoint of practical absorption performance and desorption performance, the total amount of alkanolamine(s) is preferably 30 wt % or more. The total amount of the alkanolamine(s) in the absorbing liquid of the present invention is selected from the range of preferably 30 to 60 wt %, more preferably 30 to 55 wt %, and particularly preferably 40 to 55 wt %.

Examples of the low-molecular-weight diol compound include $C_{2-8}$ aliphatic diol compounds (e.g., ethylene glycol, diethylene glycol, triethylene glycol, 1,2-propanediol, 1,3-propanediol, 1,2-butanediol, 1,3-butanediol, and 1,4-butanediol), and ethylene glycol is preferable.

The absorbing liquid of the present invention comprises at least either a low-molecular-weight diol compound or glycerin. When a low-molecular-weight diol compound is added, the low-molecular-weight diol compound for use may be a single low-molecular-weight diol compound or a combination of two or more low-molecular-weight diol compounds. Of the low-molecular-weight diol compound and glycerin, ethylene glycol is preferable. The total amount of the low-molecular-weight diol compound and glycerin in the absorbing liquid of the present invention is preferably 5 to 30 wt %, and more preferably 5 to 20 wt %.

The absorbing liquid of the present invention comprises water.

The content of water in the absorbing liquid of the present invention is not particularly limited, and the remaining liquid may be water.

The water for use in the absorbing liquid of the present invention is not particularly limited, and distilled water, ion-exchanged water, tap water, groundwater, etc. can be suitably used.

The absorbing liquid of the present invention may optionally comprise components other than the alkanolamine represented by formula (1), the low-molecular-weight diol, glycerin, and water as long as the effects of the present invention are not impaired. Other components include stabilizers for ensuring chemical or physical stability of the liquid (e.g., side reaction inhibitors such as antioxidants), degradation inhibitors for inhibiting the degradation of materials of devices or equipment used with the liquid of the present invention (e.g., corrosion inhibitors), and antifoaming agents (e.g., surfactants). The content of these components is not particularly limited as long as the effects of the present invention are not impaired.

Examples of the carbon dioxide-containing gas include exhaust gases from thermal power plants using fuels such as heavy oil and natural gas, factory boilers, cement plant kilns, ironworks blast furnaces for reducing iron oxide with coke, and ironworks converters for burning carbon contained in pig iron to manufacture steel. The concentration of carbon dioxide in the gas is not particularly limited, and may typically be about 5 to 30 vol %, and particularly about 10 to 20 vol %. The concentration of carbon dioxide within these numerical ranges allows the effects of the present invention to be suitably achieved. The carbon dioxide-containing gas may contain impurity gases derived from sources such as water vapor and CO, in addition to carbon dioxide.

Method for Absorbing and Capturing Carbon Dioxide

The method for separating and capturing carbon dioxide of the present invention comprises step A of bringing the absorbing liquid into contact with a carbon dioxide-containing gas to obtain the absorbing liquid that has absorbed carbon dioxide from the carbon dioxide-containing gas, and step B of heating the absorbing liquid that has absorbed carbon dioxide obtained in step A to desorb and regenerate carbon dioxide from the absorbing liquid, and capturing the desorbed carbon dioxide.

Step A: Step of Absorbing Carbon Dioxide

In the present invention, the absorbing liquid is brought into contact with a carbon dioxide-containing gas, and the liquid thereby absorbs carbon dioxide. The method for bringing the absorbing liquid into contact with a carbon dioxide-containing gas to absorb carbon dioxide is not particularly limited, and examples include a method comprising bubbling a carbon dioxide-containing gas in the absorbing liquid to absorb carbon dioxide, a method comprising mist-spraying the absorbing liquid over a carbon dioxide-containing gas stream (misting or spraying method), and a method comprising bringing a carbon dioxide-containing gas into countercurrent contact with the absorbing liquid in an absorption tower containing a porcelain or metal mesh filler.

Carbon dioxide in a carbon dioxide-containing gas is absorbed into the absorbing liquid at a temperature of typically about 60° C. or less, preferably about 50° C. or less, and more preferably in the range of about 20 to 45° C.

As the temperature at which carbon dioxide in a carbon dioxide-containing gas is absorbed into the absorbing liquid decreases, the absorption amount of carbon dioxide increases. However, how far the temperature should be lowered is determined in accordance with the gas temperature of the carbon dioxide-containing gas, the heat recovery target, and the like. Because the absorption of carbon dioxide by amines is an exothermic reaction, increasing the absorption amount of carbon dioxide at low temperatures requires energy for cooling the absorbing liquid. Thus, the step of absorbing carbon dioxide is typically performed at a temperature of around 40° C.

The step of absorbing carbon dioxide is typically performed under substantially atmospheric pressure. Although the absorption step can be performed under increased pressure to increase the performance in absorbing carbon dioxide, the step is preferably performed under atmospheric pressure to save energy consumption for increasing pressure.

Step B: Step of Desorbing and Regenerating Carbon Dioxide

In the present invention, the absorbing liquid that has absorbed carbon dioxide obtained in step A is heated to desorb carbon dioxide, and the desorbed pure or high-concentration carbon dioxide is captured.

Examples of the method for desorbing and regenerating carbon dioxide from the absorbing liquid that has absorbed carbon dioxide include a method comprising heating and boiling the absorbing liquid in a vessel to desorb carbon dioxide, and a method comprising heating the absorbing liquid in a tray distillation tower, spray tower, or regeneration tower containing a porcelain or metal mesh filler to increase the liquid contact interface. These methods desorb carbon dioxide present in the form of bicarbonate ions in the absorbing liquid and regenerate the carbon dioxide as molecular carbon dioxide.

When carbon dioxide is desorbed and regenerated from an absorbing liquid, and the absorbing liquid is a conventional aqueous liquid, the absorbing liquid is set to about 100 to 120° C. As the temperature of the absorbing liquid rises, the amount of desorbed carbon dioxide increases. However, raising the temperature requires additional energy to heat the absorbing liquid. The temperature is thus determined depending on the gas temperature, heat recovery target, and the like in the process of exhausting carbon dioxide-containing gases.

In the present invention, when carbon dioxide is desorbed and regenerated from the absorbing liquid, the absorbing liquid may be about 70 to 120° C., or 70 to 95° C. For example, by optimizing the design of the regeneration tower to use "low-grade waste heat," a sufficient amount of carbon dioxide can be desorbed at a low temperature in the range of 80 to 95° C.

The absorbing liquid from which carbon dioxide has been desorbed and captured in step B can be sent back to step A, and recycled.

Action

While substantially maintaining a high capture amount of carbon dioxide captured from a carbon dioxide-containing gas, the present invention can improve the amount of carbon dioxide desorbed at low temperatures from the absorbing liquid that has absorbed carbon dioxide. In particular, the present invention can achieve a sufficient desorption amount at temperatures within the range of 80 to 95° C., which is significantly lower than in the prior art.

In addition, the present invention increases the desorption rate of carbon dioxide and the desorption amount of carbon dioxide relative to the absorption amount of carbon dioxide (which hereinafter may be referred to as "regeneration efficiency" in this specification), meaning that carbon dioxide can be captured at lower energy costs. The thus-captured carbon dioxide is highly pure (typically 99 vol % or more), and has applications in chemical and food industries. The carbon dioxide can also be sequestered underground in EOR (enhanced oil recovery) or CCS (carbon dioxide capture and storage), the commercial viability of which is currently being studied.

EXAMPLES

The following Examples describe the present invention in more detail. However, the present invention is not limited to the Examples.

In the Examples, alkanolamines, low-molecular-weight diol compounds, and glycerin for use are denoted as below.
EGL: ethylene glycol
Gly: glycerin
1,2-PD: 1,2-propanediol
1,3-PD: 1,3-propanediol
1,2-BD: 1,2-butanediol
1,4-BD: 1,4-butanediol
TEG: triethylene glycol
IPAE: N-isopropylaminoethanol
AMP: 2-amino-2-methyl-1-propanol
EAE: N-ethylaminoethanol
NBAE: N-n-butylaminoethanol
2A1P: 2-amino-1-propanol Example 1

Ethylene glycol, water, and IPAE were mixed at a weight ratio of 10:35:55, thereby obtaining an absorbing liquid.

Example 2

Ethylene glycol, water, and IPAE were mixed at a weight ratio of 20:25:55, thereby obtaining an absorbing liquid.

Example 3

Ethylene glycol, water, IPAE, and AMP were mixed at a weight ratio of 10:30:45:15, thereby obtaining an absorbing liquid.

Example 4

Ethylene glycol, water, IPAE, and AMP were mixed at a weight ratio of 10:35:47.5:7.5, thereby obtaining an absorbing liquid.

Example 5

Ethylene glycol, water, IPAE, and AMP were mixed at a weight ratio of 20:25:45:10, thereby obtaining an absorbing liquid.

Example 6

Ethylene glycol, water, IPAE, and AMP were mixed at a weight ratio of 10:35:42.5:12.5, thereby obtaining an absorbing liquid.

Example 7

Ethylene glycol, water, IPAE, and AMP were mixed at a weight ratio of 5:40:40:15, thereby obtaining an absorbing liquid.

Example 8

Glycerin, water, IPAE, and AMP were mixed at a weight ratio of 5:40:40:15, thereby obtaining an absorbing liquid.

Examples 9 and 10

Ethylene glycol, water, IPAE, and AMP were mixed at a weight ratio of 10:35:40:15, thereby obtaining an absorbing liquid.

Examples 11 to 14

Ethylene glycol, water, IPAE, and AMP were mixed at a weight ratio of 20:25:40:15, thereby obtaining an absorbing liquid.

Example 15

Ethylene glycol, water, IPAE, and AMP were mixed at a weight ratio of 25:20:40:15, thereby obtaining an absorbing liquid.

Example 16

1,2-Propanediol, water, IPAE, and AMP were mixed at a weight ratio of 10:35:40:15, thereby obtaining an absorbing liquid.

Example 17

1,2-Butanediol, water, IPAE, and AMP were mixed at a weight ratio of 10:35:40:15, thereby obtaining an absorbing liquid.

Example 18

Glycerin, water, IPAE, and AMP were mixed at a weight ratio of 10:35:40:15, thereby obtaining an absorbing liquid.

Example 19

1,2-Butanediol, water, IPAE, and AMP were mixed at a weight ratio of 20:25:40:15, thereby obtaining an absorbing liquid.

Example 20

1,3-Propanediol, water, IPAE, and AMP were mixed at a weight ratio of 20:25:40:15, thereby obtaining an absorbing liquid.

Example 21

1,4-Butanediol, water, IPAE, and AMP were mixed at a weight ratio of 20:25:40:15, thereby obtaining an absorbing liquid.

Example 22

Triethylene glycol, water, IPAE, and AMP were mixed at a weight ratio of 20:25:40:15, thereby obtaining an absorbing liquid.

Example 23

Ethylene glycol, water, IPAE, and AMP were mixed at a weight ratio of 20:35:35:10, thereby obtaining an absorbing liquid.

Example 24

Ethylene glycol, water, IPAE, and EAE were mixed at a weight ratio of 20:25:40:15, thereby obtaining an absorbing liquid.

Example 25

Ethylene glycol, water, IPAE, and NBAE were mixed at a weight ratio of 20:25:40:15, thereby obtaining an absorbing liquid.

Example 26

Ethylene glycol, water, IPAE, and 2A1P were mixed at a weight ratio of 20:25:40:15, thereby obtaining an absorbing liquid.

Comparative Example 1

Water and IPAE were mixed at a weight ratio of 45:55, thereby obtaining an absorbing liquid.

Comparative Example 2

Water, IPAE, and AMP were mixed at a weight ratio of 45:40:15, thereby obtaining an absorbing liquid.

Comparative Example 3

Water, IPAE, and AMP were mixed at a weight ratio of 45:40:15, thereby obtaining an absorbing liquid.

Comparative Example 4

Water, IPAE, and EAE were mixed at a weight ratio of 45:40:15, thereby obtaining an absorbing liquid.

Comparative Example 5

Water, IPAE, and NBAE were mixed at a weight ratio of 45:40:15, thereby obtaining an absorbing liquid.

Comparative Example 6

Water, IPAE, and 2A1P were mixed at a weight ratio of 45:40:15, thereby obtaining an absorbing liquid.

The alkanolamines, low-molecular-weight diol compounds, and glycerin used in the Examples and Comparative Examples above are brand-name reagent products from Tokyo Chemical Industry Co., Ltd., and other companies, and products of general purity were used. For IPAE, a product with a purity of 99% or more manufactured by Koei Chemical Co., Ltd., was used. The water for use was ion-exchanged water.

Test Example 1

The absorbing liquids of Examples and Comparative Examples were measured for the absorption amount, desorption amount, and desorption rate of carbon dioxide. The measurement was performed with a carbon dioxide absorption and desorption apparatus to which a carbon dioxide gas cylinder (purity: 99.9%) and a nitrogen gas bottle (purity: 99.9%), a carbon dioxide gas flow rate controller and a nitrogen gas flow rate controller, a glass reactor (0.5 L), a mechanical stirrer and a temperature controller, a gas flowmeter, a chiller, and a carbon dioxide analyzer (Yokogawa, IR100) were sequentially connected.

The glass reactor outside was surrounded by an inbuilt electric heater, so that the temperature of the absorbing liquid in the glass reactor could be freely controlled with the temperature controller.

0.1 L of an absorbing liquid was added to the glass reactor, and the gas in the upper part of the glass reactor was replaced by nitrogen gas. The absorbing liquid in the glass reactor was maintained at 40° C. While the liquid was fully stirred at a rotation frequency of 700 rpm, carbon dioxide gas at a flow rate of 0.14 L/min and nitrogen gas at a flow rate of 0.56 L/min were blown into the absorbing liquid in the glass reactor to start step A, and step A continued for 2 hours.

After completion of step A, the absorbing liquid in the glass reactor was subsequently heated to 80° C. to 95° C. to start step B, and step B continued for 2 hours.

In steps A and B, the exhaust gas from the glass reactor was analyzed with the carbon dioxide analyzer. The amount of carbon dioxide dissolved in the absorbing liquid (i.e., the absorption amount) was determined from a change in carbon dioxide concentration over time measured with the carbon dioxide analyzer. The amount of carbon dioxide desorbed from the absorbing liquid by heating was defined as a value determined by deducting the amount of desorbed carbon dioxide after 2 hours from the start of step B from the amount of absorbed carbon dioxide after 2 hours from the start of step A. The desorption rate of carbon dioxide desorbed from the absorbing liquid was defined as a change in the absorption amount of carbon dioxide per unit time during 10 minutes after the start of desorption of carbon dioxide in step B.

Table 1 shows the compositions and measurement results of the absorbing liquids of the Examples and Comparative Examples.

Absorbing liquids of the Examples exhibited significantly higher performance in the desorption rate and regeneration efficiency of carbon dioxide than the absorbing liquids of the Comparative Examples.

The results reveal that absorbing liquids that comprise at least one alkanolamine represented by formula (1), a low-molecular-weight diol compound and/or glycerin, and water for separating and capturing carbon dioxide from a carbon dioxide-containing gas have excellent performance in the desorption rate and regeneration efficiency of carbon dioxide, as compared with conventional aqueous solutions, and that the absorbing liquids show promise for their excellent desorption performance particularly at low temperatures.

TABLE 1

| | Amount of Diol and Others (wt %) | Amount of Water (wt %) | Amine Composition (wt %) | Absorption Temperature-Desorption Temperature (° C.) | Absorption Amount (g-CO$_2$/kg-Absorbing Liquid) | Desorption Rate (g-CO$_2$/kg-Absorbing Liquid/min) | Desorption Amount (g-CO$_2$/kg-Absorbing Liquid) | Regeneration Efficiency (%) (Desorption Amount/Absorption Amount) |
|---|---|---|---|---|---|---|---|---|
| Example 1 | EGL_10 | 35 | IPAE_55 | 40-90 | 120 | 11.2 | 115 | 96 |
| Example 2 | EGL_20 | 25 | IPAE_55 | 40-90 | 109 | 10.4 | 100 | 92 |
| Example 3 | EGL_10 | 30 | IPAE_45 + AMP_15 | 40-90 | 125 | 8.7 | 104 | 83 |
| Example 4 | EGL_10 | 35 | IPAE_47.5 + AMP_7.5 | 40-90 | 123 | 10.6 | 110 | 89 |
| Example 5 | EGL_20 | 25 | IPAE_45 + AMP_10 | 40-90 | 122 | 11.2 | 113 | 92 |
| Example 6 | EGL_10 | 35 | IPAE_42.5 + AMP_12.5 | 40-90 | 124 | 10.8 | 120 | 97 |
| Example 7 | EGL_5 | 40 | IPAE_40 + AMP_15 | 40-90 | 133 | 10.4 | 115 | 87 |
| Example 8 | Gly_5 | 40 | IPAE_40 + AMP_15 | 40-90 | 131 | 10.4 | 109 | 84 |
| Example 9 | EGL_10 | 35 | IPAE_40 + AMP_15 | 40-95 | 126 | 11.2 | 111 | 89 |
| Example 10 | EGL_10 | 35 | IPAE_40 + AMP_15 | 40-90 | 125 | 10.8 | 114 | 91 |
| Example 11 | EGL_20 | 25 | IPAE_40 + AMP_15 | 40-95 | 126 | 12.8 | 124 | 99 |
| Example 12 | EGL_20 | 25 | IPAE_40 + AMP_15 | 40-90 | 123 | 11.6 | 122 | 99 |
| Example 13 | EGL_20 | 25 | IPAE_40 + AMP_15 | 40-85 | 125 | 10.5 | 118 | 95 |
| Example 14 | EGL_20 | 25 | IPAE_40 + AMP_15 | 40-80 | 123 | 7.8 | 101 | 82 |
| Example 15 | EGL_25 | 20 | IPAE_40 + AMP_15 | 40-90 | 110 | 9.7 | 97 | 88 |
| Example 16 | 1,2-PD_10 | 35 | IPAE_40 + AMP_15 | 40-90 | 125 | 9.8 | 105 | 84 |
| Example 17 | 1,2-BD_10 | 35 | IPAE_40 + AMP_15 | 40-90 | 121 | 9.7 | 108 | 89 |
| Example 18 | Gly_10 | 35 | IPAE_40 + AMP_15 | 40-90 | 120 | 9.5 | 105 | 88 |
| Example 19 | 1,2-PD_20 | 25 | IPAE_40 + AMP_15 | 40-90 | 120 | 10.0 | 107 | 89 |
| Example 20 | 1,3-PD_20 | 25 | IPAE_40 + AMP_15 | 40-90 | 118 | 8.6 | 110 | 94 |
| Example 21 | 1,4-BD_20 | 25 | IPAE_40 + AMP_15 | 40-90 | 117 | 9.1 | 112 | 96 |
| Example 22 | TEG_20 | 25 | IPAE_40 + AMP_15 | 40-90 | 112 | 9.5 | 101 | 90 |
| Example 23 | EGL_20 | 35 | IPAE_35 + AMP_10 | 40-90 | 113 | 9.3 | 97 | 86 |
| Example 24 | EGL_20 | 25 | IPAE_40 + EAE_15 | 40-90 | 126 | 9.6 | 107 | 85 |
| Example 25 | EGL_20 | 25 | IPAE_40 + NBAE_15 | 40-90 | 111 | 7.6 | 99 | 89 |
| Example 26 | EGL_20 | 25 | IPAE_40 + 2A1P_15 | 40-90 | 134 | 9.4 | 106 | 79 |
| Comparative Example 1 | 0 | 45 | IPAE_55 | 40-90 | 140 | 9.4 | 122 | 87 |
| Comparative Example 2 | 0 | 45 | IPAE_40 + AMP_15 | 40-90 | 137 | 6.5 | 117 | 85 |
| Comparative Example 3 | 0 | 45 | IPAE_40 + AMP_15 | 40-80 | 139 | 5.1 | 99 | 71 |
| Comparative Example 4 | 0 | 45 | IPAE_40 + EAE_15 | 40-90 | 150 | 4.8 | 100 | 67 |
| Comparative Example 5 | 0 | 45 | IPAE_40 + NBAE_15 | 40-90 | 136 | 5.2 | 96 | 71 |
| Comparative Example 6 | 0 | 45 | IPAE_40 + 2A1P_15 | 40-90 | 143 | 5.2 | 95 | 66 |

The invention claimed is:

1. An absorbing liquid for separating and capturing carbon dioxide from a carbon dioxide-containing gas, the liquid comprising:
at least one alkanolamine represented by formula (1)

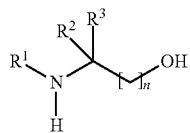

wherein $R^1$ represents hydrogen or $C_{1-4}$ alkyl, $R^2$ and $R^3$ are identical or different and each represent hydrogen or $C_{1-3}$ alkyl, $R^1$, $R^2$, and $R^3$ are not all hydrogen, and n is 1 or 2, wherein the at least one alkanolamine represented by formula (1) is an amine mixture of N-isopropylaminoethanol and 2-amino-2-methyl-1-propanol;
a low-molecular-weight diol compound and/or glycerin, wherein the low-molecular-weight diol compound and/or glycerin is ethylene glycol and is present in an amount of from 10 wt % to 20 wt %; and
water.

2. A method for separating and capturing carbon dioxide from a carbon dioxide-containing gas, the method comprising:
bringing the absorbing liquid according to claim 1 into contact with a carbon dioxide-containing gas to obtain the absorbing liquid that has absorbed carbon dioxide from the carbon dioxide-containing gas; and
heating the absorbing liquid that has absorbed carbon dioxide to desorb and regenerate carbon dioxide from the absorbing liquid and capture the desorbed carbon dioxide.

3. The method according to claim 2, wherein the absorbing liquid that has absorbed carbon dioxide is heated at a temperature of from 80° C. to 95° C. to desorb carbon dioxide.

4. The method of claim 2, wherein the carbon dioxide regenerated from the absorbing liquid is at least 99 vol %.

* * * * *